US008284456B2

(12) United States Patent
Tanaka et al.

(10) Patent No.: US 8,284,456 B2
(45) Date of Patent: Oct. 9, 2012

(54) IMAGE PROCESSING APPARATUS, IMAGE FORMING APPARATUS, AND COMPUTER-READABLE RECORDING MEDIUM STORING IMAGE PROCESSING PROGRAM

(75) Inventors: Kunihiko Tanaka, Osaka (JP); Ariyoshi Hikosaka, Osaka (JP)

(73) Assignee: Kyocera Mita Corporation (JP)

( * ) Notice: Subject to any disclaimer, the term of this patent is extended or adjusted under 35 U.S.C. 154(b) by 598 days.

(21) Appl. No.: 12/429,744

(22) Filed: Apr. 24, 2009

(65) Prior Publication Data

US 2009/0268256 A1  Oct. 29, 2009

(30) Foreign Application Priority Data

Apr. 28, 2008  (JP) ................................. 2008-116692

(51) Int. Cl.
*G06F 3/12* (2006.01)
*G06F 15/16* (2006.01)
*G04K 15/00* (2006.01)
*G06K 3/12* (2006.01)
*H04N 1/46* (2006.01)
*H04N 1/04* (2006.01)
*G03G 15/00* (2006.01)

(52) U.S. Cl. ..................... 358/3.28; 358/1.15; 358/1.14; 358/1.13; 358/505; 358/488; 399/82; 709/248

(58) Field of Classification Search .................. 358/1.15, 358/1.14, 1.13; 386/46; 244/129; 399/82
See application file for complete search history.

(56) References Cited

U.S. PATENT DOCUMENTS

| 6,048,271 | A  | * | 4/2000 | Barcelou ......................... 463/48 |
| 6,621,590 | B1 | * | 9/2003 | Livingston .................... 358/1.15 |
| 7,379,950 | B2 | * | 5/2008 | Sato et al. .............................. 1/1 |
| 7,580,943 | B2 | * | 8/2009 | Sakura et al. ......................... 1/1 |
| 7,685,318 | B2 | * | 3/2010 | Nagashima ................... 709/248 |
| 7,865,105 | B2 | * | 1/2011 | Abe ................................. 399/82 |
| 2002/0118948 | A1 | * | 8/2002 | Jones ............................. 386/46 |
| 2004/0195455 | A1 | * | 10/2004 | Maida ........................ 244/129.1 |
| 2005/0078331 | A1 | * | 4/2005 | Guan et al. .................... 358/1.14 |
| 2006/0126098 | A1 |   | 6/2006 | Shimura et al. |
| 2006/0221382 | A1 | * | 10/2006 | Sedky et al. ................. 358/1.15 |

FOREIGN PATENT DOCUMENTS

| JP | 2004-274092 | 9/2004 |
| JP | 2006-173757 | 6/2006 |
| JP | 2006-229709 | 8/2006 |

* cited by examiner

*Primary Examiner* — Akwasi M Sarpong
(74) *Attorney, Agent, or Firm* — Gerald E. Hespos; Michael J. Porco (57) ABSTRACT

A special pattern determination section determines whether a special pattern is included in a document image read by a document reading section. If the special pattern determination section determines that the special pattern is included, the breaking pattern applying section applies a breaking pattern to the document image, and the print image generating section accumulates image data of the document image applied with the breaking pattern into a memory. On the other hand, if it is determined that the special pattern is not included, the print image generating section accumulates the image data of the document image directly into the memory. Then, if it is set by a user so as not to print the breaking pattern, the controller deletes image data of the document image accumulated in the memory and applied with the breaking pattern.

6 Claims, 11 Drawing Sheets

IMAGE PROCESSING APPARATUS, IMAGE FORMING APPARATUS, AND COMPUTER-READABLE RECORDING MEDIUM STORING IMAGE PROCESSING PROGRAM

BACKGROUND OF THE INVENTION

1. Field of the Invention

The present invention relates to an image processing apparatus, an image forming apparatus, and a computer-readable recording medium storing an image processing program. More particularly, it relates to a technology for preventing copying of a document image to which a special pattern for preventing copying is embedded.

2. Description of the Related Art

Conventionally, as a method for preventing copying of a confidential document and the like, there has been known a method of using a pattern image which causes warning characters to appear if the confidential document is copied with a copying machine. Creating a document with use of such pattern image has a psychological effect for preventing unfair copying, and makes it possible to distinguish an original and a copy.

However, although the method using the pattern image has a psychological effect for preventing unfair copying, it cannot physically prevent copying, and a leakage of information cannot be prevented completely. Therefore, as disclosed in Japanese Patent Unexamined Publication No. 2004-274092, there has been proposed a copying machine having a copy guard function for preventing a leakage of document information. According to such copying machine, a special pattern is detected from image data read from a document. If the special pattern is detected, copying of a document is prohibited, or a predetermined breaking pattern is printed out without printing a document.

Further, according to technologies disclosed in Japanese Patent Unexamined Publication No. 2006-173757 and Japanese Patent Unexamined Publication No. 2006-229709, in a case where a special pattern is detected from a document image, a breaking pattern is applied to the document image in halfway and then printed, or a blank image is outputted or transmitted, so that normal copying or reading is prevented.

SUMMARY OF THE INVENTION

The present invention was made by further improving the conventional technologies.

In summary, according to an aspect of the present invention, an image processing apparatus includes: a reading section which reads a document image from a document; a storage section which stores a predetermined special pattern; a determination section which determines whether the special pattern is included in the document image read by the reading section; a breaking section which breaks the document image by applying a breaking pattern to the document image when the determination section determines that the special pattern is included in the document image; an output section which outputs the document image; and a controller which decides whether to control the output section to output the document image having the breaking pattern in accordance with a predetermined setting, and controls output of the document image by the output section in accordance with the decision.

These and other objects, features and advantages of the present invention will become more apparent upon reading of the following detailed description along with the accompanied drawings.

DETAILED DESCRIPTION OF THE PREFERRED EMBODIMENTS

Hereinafter, an image processing apparatus, an image forming apparatus, an image processing program, and a computer-readable recording medium storing an image processing program in accordance with embodiments of the present invention will be described. The image forming apparatus in accordance with the following embodiments includes the image processing apparatus in accordance with the embodiments of the present invention, and a copying machine will be described as an example of the image forming apparatus. Other than the above, the image forming apparatus may be a complex machine having functions of a copying machine, a scanner, a facsimile machine, a printer, and the like, and the image processing apparatus may be a scanner, a facsimile machine, or the like.

First Embodiment

Figure 1:
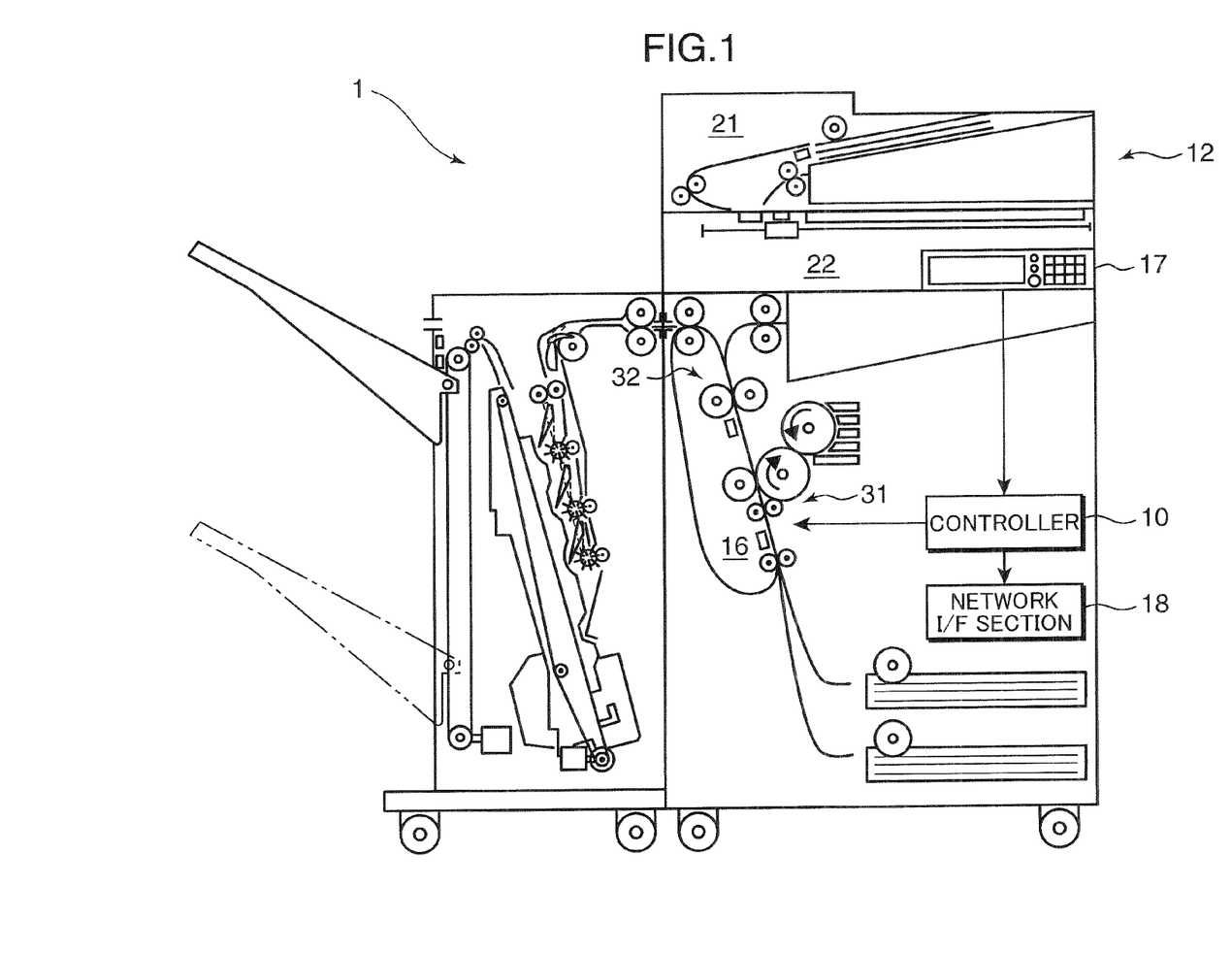
FIG. 1 shows a schematic configuration of a copying machine.

FIG. 1 shows a schematic configuration of a copying machine 1 in accordance with the present embodiment. The copying machine 1 includes a document reading section 12, an image forming section 16, a controller 10, a network I/F section 18, and an input operation section 17. The document reading section 12 has an automatic document feeding unit (Auto Document Feeder) 21, and a scanner unit 22. The automatic document feeding unit 21 feeds and conveys a document set by a user one after another to the scanner unit 22. The scanner unit 22 reads an image on the document fed and conveyed by the automatic document feeding unit 21, and transmits a read document image to a controller 10 at each time when reading one sheet of document.

The image forming section 16 includes a developing section 31, a fixing section 32, and the like. The developing section 31 has a photosensitive drum and the like which form an image onto a sheet which is conveyed through a conveyance passage for conveying a sheet stacked on a sheet-feeding cassette. The fixing section 32 heats the sheet on which the image is formed to fix the image formed by the image forming section 16.

Figure 2:
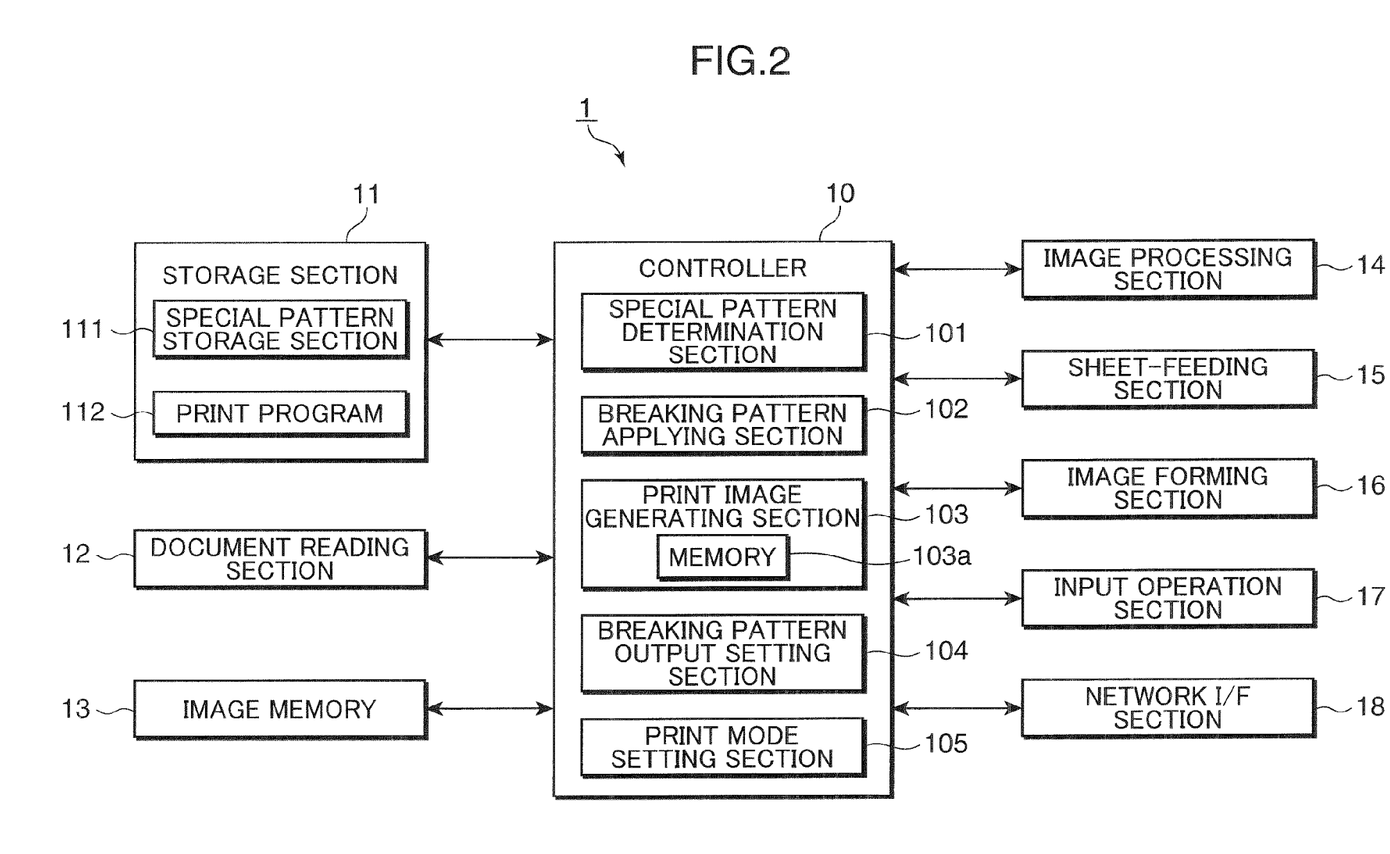
FIG. 2 is a block diagram showing an electric configuration of the copying machine.

FIG. 2 is a function block diagram showing an electric configuration of the copying machine 1 in accordance with the present embodiment. The copying machine 1 includes the controller 10, a storage section 11, the document reading section 12, an image memory 13, an image processing section 14, a sheet-feeding section 15, the image forming section 16, the input operation section 17, and a network I/F section 18.

The controller 10 is configured by a CPU (Central Processing Unit) and the like, and performs an overall control with respect to the copying machine by reading a program stored in the storage section 11 and executing a processing in accordance with an inputted instruction signal and the like, and outputting an instruction signal to each functional section, and performing data transfer. Further, the controller 10 has a special pattern determination section 101, a breaking pattern applying section 102, and a print image generating section 103.

The special pattern determination section 101 detects an image pattern matching with a special pattern stored in a special pattern storage section 111 of the storage section 11, from a document image read by the document reading section 12. If an image pattern matching with the special pattern is detected, the special pattern determination section 101 determines that the document image includes the special pattern.

Here, the "special pattern" is a pattern for prohibiting normal copying or scanning in a copying machine, a scanner, or the like having a copy guard function. The special pattern is mainly embedded into a confidential document or the like and printed out, and serves to prevent a leakage of information and the like. Further, the breaking pattern is a predetermined image (a black solid image, an abstract image expressing no meaning, or the like). Other than those, the breaking pattern may be a pattern having no image.

The breaking pattern applying section 102 applies the breaking pattern to a document image which is determined by the special pattern determination section 101 as including the special pattern. It should be understood that the breaking pattern applying section 102 may execute a processing of replacing the document image with the breaking pattern. In other words, the breaking pattern applying section 102 may execute any processing as long as the processing breaks the document image read by the document reading section 12.

The print image generating section 103 accumulates and stores image data of the document image read by the document reading section 12 and image data of the document image having the breaking pattern applied by the breaking pattern applying section 102 as print image data into a memory 103a.

The breaking pattern output setting section 104, in accordance with an instruction based on operation by a user to the input operation section 17, receives setting of whether to output or print the document image having the breaking pattern applied by the breaking pattern applying section 102. The controller 10, in accordance with contents of setting in the breaking pattern output setting section 104, controls whether to control the network I/F section 18 to output data having the breaking pattern and whether to control the image forming section 16 to print the document image having the breaking pattern, when the document image including the special pattern embedded is read by the document reading section 12.

At the time when printing is performed by the image forming section 16, a print mode setting section 105 receives setting regarding in which mode the copying operation is performed among (1) single-sided document reading and single-sided printing, (2) single-sided document reading and double-sided printing, (3) double-sided document reading and double-sided printing, and (4) double-sided document reading and single-sided printing, in accordance with an instruction based on operation of the input operation section 17 by a user.

The storage section 11 stores a program, data, and the like for realizing various functions of the copying machine 1. In the present embodiment, the storage section 11 stores a print program 112. Further, the storage section 11 serves as a special pattern storage section 111 which stores a special pattern indicating prohibition of copying. The print program 112 is a program for operation control of printing. Further, the printing program 112 corresponds to an image processing program recited in claims. The print program 112 is a program which allows the controller 10 to accumulate and store image data of a read document image into the memory 103a. Also, the print program 112 allows the controller 10 to apply the breaking pattern into a document image which is determined as including the special pattern, accumulate and store the image data having the breaking pattern into the memory 103a, delete image data having the breaking pattern (in other words, a page having the breaking pattern) from the memory 103a in accordance with a predetermined setting, and output or print the image.

The document reading section 12 reads a document with an image sensor such as a CCD (Charge Coupled Device) sensor, a CMOS (Complementary Metal Oxide Semiconductor) sensor, or the like and converts the read document image into image data.

The image memory 13 temporarily stores image data transmitted from an external device through the network I/F section 18. The image processing section 14 applies image processing such as image correction, enlargement/reduction, and the like with respect to print image data stored in the memory 103a or image data stored in the image memory 13. The sheet-feeding section 15 takes a sheet one after another from the sheet-feeding cassette and conveys the sheet to the image forming section 16.

The image forming section 16 forms an image onto a sheet in accordance with image data outputted from the memory 103a or the image memory 13. The input operation section 17 includes a display panel and various kinds of operation buttons, and if a user performs operation, the input operation section 17 outputs an operation signal to the controller 10. The network I/F section 18 is configured by a communication module such as a LAN board and performs transmission of various data with an external device through a network (not illustrated) connected at the network I/F section 18.

Figure 3:
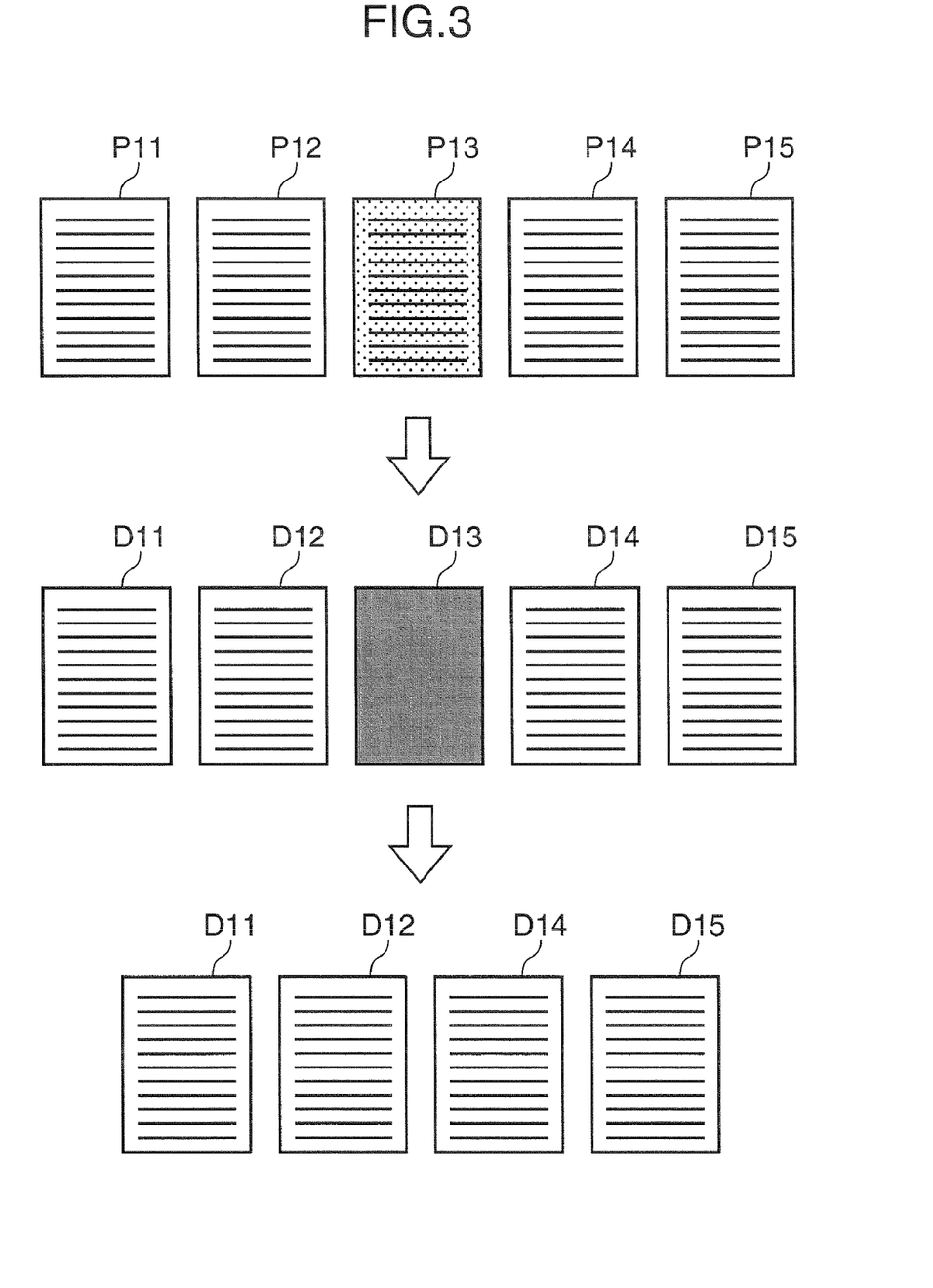
FIG. 3 shows a case where documents including a document embedded with a special pattern are copied.

Next, the case of copying a plurality of documents including a document embedded with the special pattern will be described with reference to FIG. 3. In FIG. 3, images identified by reference numerals P11-P15 are document images, and the document image P13 is embedded with the special pattern. If documents on which the document images P11-P15 are printed respectively are copied in a normal manner with use of a conventional copying machine having a copy guard function (function to prohibit copying an image embedded with the special pattern), the document images P11, P12, P14, and P15 are printed directly. However, the document image P13 is not printed, and the breaking pattern is printed alternatively. In such case, the sheet on which the breaking pattern is printed presents no information corresponding to the information of the original document, thus it becomes an unnecessary page and is likely to be discarded. Thus, it had been waste of toner and sheet.

Further, in a case of the complex machine having the copy guard function, when image data of the read document images P11-P15 is transmitted to a facsimile machine on a destination side by using a facsimile function, the breaking pattern as an alternative of the image P13 is also transmitted together. Therefore, it has caused a user on a destination side to perform wasteful printing of image data of the document image having the breaking pattern. Further, also when image data of the read document image is transmitted to an external personal computer or the like through the network I/F section 18, the breaking pattern is also transmitted together. Therefore, it may cause the amount of transferred data to become wastefully large, and cause loading time of data on an external personal computer to be long, thereby obstructing operation.

Therefore, the copying machine 1 is proposed which enables setting of whether to print the breaking pattern in accordance with setting by a user. By operating the input operation section 17, a user can set whether to allow the breaking pattern output setting section 104 to output data of the breaking pattern through the network I/F section 18 and whether to allow the image forming section 16 to print the breaking pattern when the document including the special pattern is read by the document reading section 12. (a) The setting of whether to print the breaking pattern may be performed in advance by a user before printing. Alternatively, (b) setting of whether to print the breaking pattern may be set to the breaking pattern output setting section 104 in accordance with an instruction inputted by a user through the input operation section 17 when the controller 10 displays a message on a display panel or the like of the input operation section 17 to induce the user to input selection of whether to print the breaking pattern at each time when the special pattern determination section 101 determines that the document image includes the special pattern.

Further, in the case of applying the present invention to image reading apparatuses such as a scanner, a facsimile machine, and the like, a user can selectively set whether to transmit the breaking pattern in place of the document image which is determined as including the special pattern to an external device at the aforementioned timing of (a) or (b).

Describing with reference to FIG. 3, firstly, the special pattern determination section 101 determines whether the special pattern is included in the document images P11-P 15 read by the document reading section 12. If the special pattern determination section 101 determines that the special pattern is not included in the document images P11, P12, P14, and P15, which do not include the special pattern, the print image generating section 103 stores the document images P11, P12, P14, and P15 as print image data into the memory 103a in a normal manner. These print image data at this time correspond to image data D11, D12, D14, and D15.

On the other hand, when the special pattern determination section 101 determines that the document image P13 includes the special pattern, the breaking pattern applying section 102 applies the breaking pattern (or replaces the document image with the breaking pattern), and the print image generating section 103 stores the document image having the breaking pattern as print image data into the memory 103a. The print image data at this time corresponds to image data D13.

Here, if the breaking pattern output setting section 104 is so set as to print the breaking pattern, the controller 10 controls the image forming section 16 to print all of the image data D11-D15 accumulated in the memory 103a.

In the case where the setting breaking pattern output setting section 104 is so set as not to print the breaking pattern, the controller 10 deletes the image data D13 from the image data D11-D15 accumulated in the memory 103a. Thus, as shown in the lower portion of FIG. 3, the memory 103a accumulates and stores the image data D11, D12, D14, and D15, and the image forming section 16 performs printing based on these image data.

Figure 4:
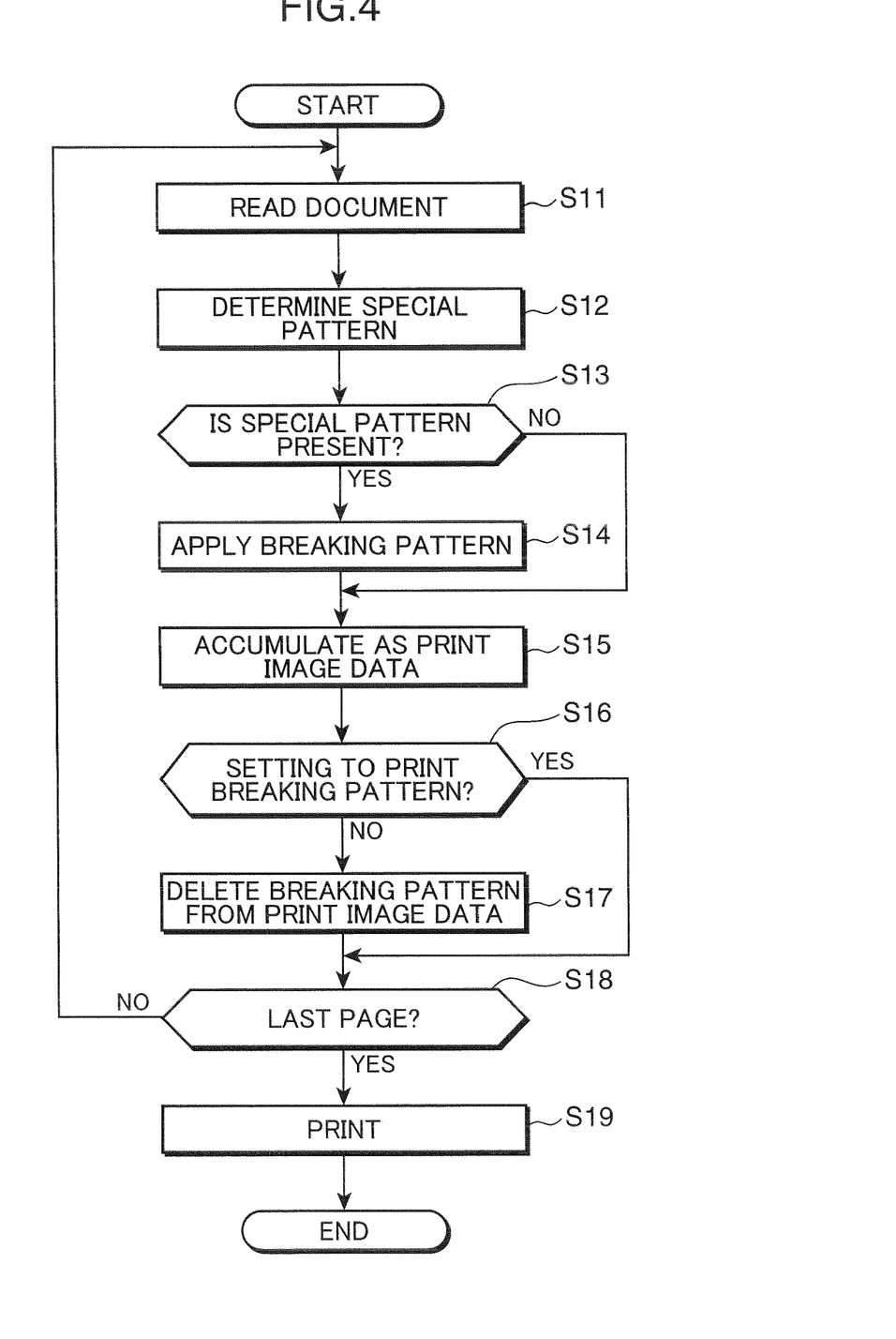
FIG. 4 is a flowchart showing a flow of a printing processing in accordance with a first embodiment.

FIG. 4 is a flowchart showing a flow of processing executed by the controller 10 in accordance with the print program 112 of the present embodiment. For example, when the copying operation is performed, firstly, the document reading section 12 reads a document image (step S11). Then, the special pattern determination section 101 determines whether the read document image includes the special pattern (step S12).

If the special pattern determination section 101 determines that the document image includes the special pattern (step S13; YES), the breaking pattern applying section 102 applies the breaking pattern into the document image (step S14), and the print image generating section 103 accumulates and stores the image data of the document image having the breaking pattern as print image data into the memory 103a (step S15).

On the other hand, if the special pattern determination section 101 determines that the document image does not include the special pattern (step S13; NO), the print image generating section 103 accumulates and stores all of image data of document image obtained in step S11 as print image data into the memory 103a (step S15).

Next, if the breaking pattern output setting section 104 is so set as to print the breaking pattern (step S16; YES), the controller 10 allows the processing to proceed to step S18. On the other hand, if the breaking pattern output setting section 104 is so set as not to print the breaking pattern (step S16; NO), the controller 10 deletes image data having the breaking pattern and stored in the memory 103a (step S17).

Then, if there is any document to be read continuously (step S18; NO), the controller 10 allows the processing to go back to step S11. If the document applied with the processing of step S15 or S17 is the last document page (step S18; YES), the controller 10 transfers the print image data stored in the memory 103a to the image forming section 16, and the image forming section 16 prints an image based on the print image data onto a sheet (step S19). Or, after the image processing section 14 applies image processing such as image correction, enlargement/reduction, and the like to the print image data stored in the memory 103a, the image forming section 16 prints an image based on the image-processed print image data onto a sheet. Then, the controller 10 terminates the processing.

As described above, a user can selectively set whether to print image data (page) of the document image having the breaking pattern, thereby wasteful use of sheet and toner can be prevented. Further, by the setting of not outputting the breaking pattern when transferring the read image data to a facsimile machine, a personal computer or the like provided outside, the amount of transferred data can be reduced, and time for transferring data can be also shortened.

The present invention is not limited to the configuration of the aforementioned embodiment, and it can be modified in various ways. For example, in the aforementioned embodiment, all of image data of a document image and a document image having the breaking pattern is temporarily stored in the memory 103a, and if the breaking pattern output setting section 104 is so set as not to print the breaking pattern, the controller 10 deletes image data of the document image having the breaking pattern from the memory 103a. Other than this, it may be so configured that the breaking pattern applying section 102 does not apply the breaking pattern to the document image, and the print image generating section 103 does not store the image data of the document image, if the breaking pattern output setting section 104 is so set as not to print the breaking pattern, and the special pattern determination section 101 determines that the document image includes the special pattern. According to such configuration, the document image including the special pattern and the document image having the breaking pattern are not stored into the memory 103a. Therefore, a processing of deleting data from the memory 103a becomes unnecessary, and the image forming section 16 does not need to print the breaking pattern.

Second Embodiment

In the first embodiment, the copying machine 1 is described which enables a user to set whether to print the breaking pattern. In the second embodiment, a copying machine will be described which automatically sets the setting of not printing the breaking pattern only in the single side printing mode. Since the configuration of the copying machine in the present embodiment is substantially the same as the copying machine 1 which was described in the first embodiment, detailed description will be omitted.

Figure 5:
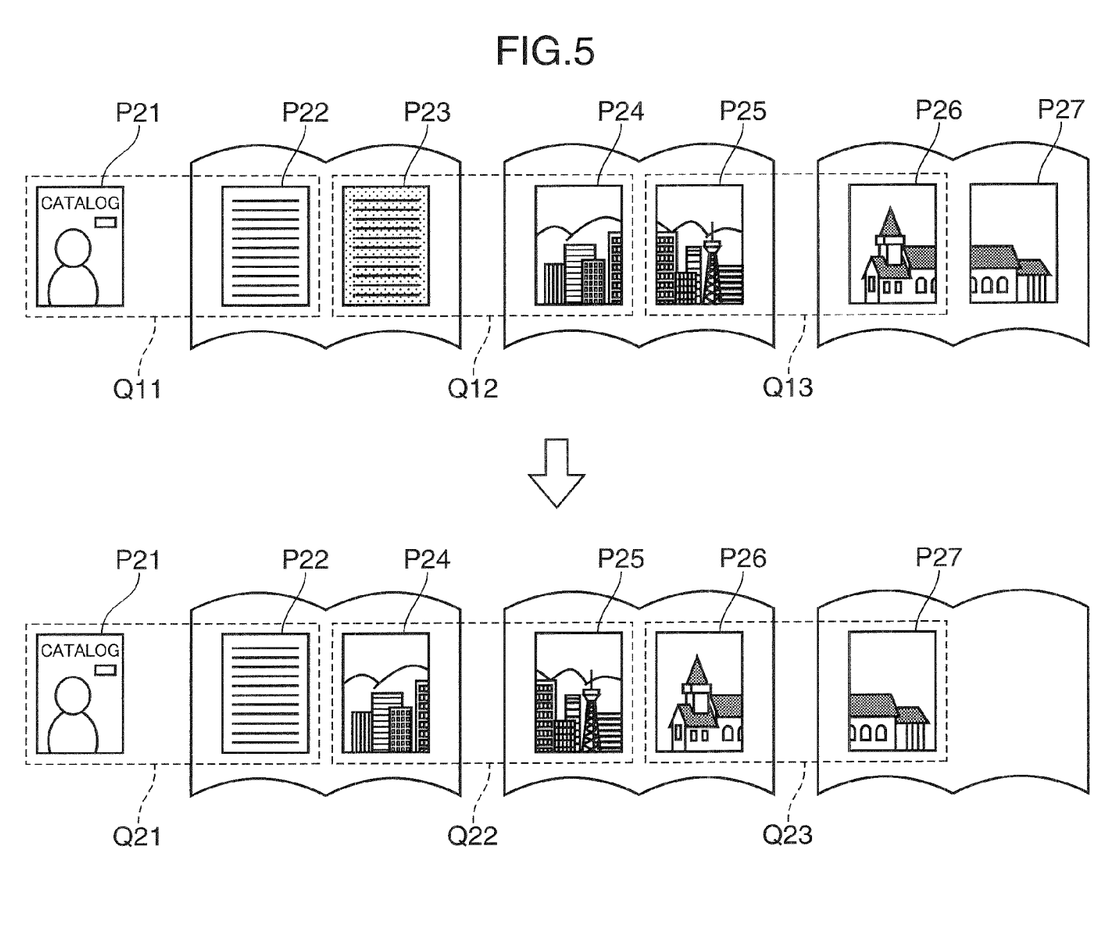
FIG. 5 shows copies which can be obtained when double-sided printed documents are copied.

FIG. 5 shows copies which can be obtained when a plurality of double-sided printed documents are copied in a case where the contents of setting of the breaking pattern output section 104 in the copying machine according to the first embodiment is set so as not to print the breaking pattern. In FIG. 5, an image P21 is an image printed on a front side of a sheet Q11, and an image P22 is an image printed on a back side of the sheet Q11. Similarly, an image P23 is an image printed on a front side of a sheet Q12, and an image P24 is an image printed on a back side of the sheet Q12, and an image P25 is an image printed on a front side of a sheet Q13, and an image P26 is an image printed on a back side of the sheet Q13.

It is assumed that the images P21-P27 are published on pages of, for example, a catalog or magazine, and each set of the images P22 and P23, the images P24 and P25, and the images P26 and P27 constitute a two-page spread. Specifically, the images P24-P27 form one picture or the like on each two-page spread.

Among these documents, the special pattern is embedded only in the image P23. If the copying machine according to the first embodiment which is so set as not to print the breaking pattern reads both sides of each of the documents Q11-Q13 and performs the double-sided printing (in the present embodiment and the following embodiment, the copying operation including the double-sided document reading and double-sided printing will be referred to as "double-sided copying"). As shown in the lower portion of FIG. 5, images other than the image P23 are copied. In other words, the image P21 is formed on a front side of a sheet Q21, and the image P22 is formed on a back side, so that a copy including the same contents as the document Q11 can be obtained. However, since the image P23 is not printed, the image P24 is formed on the front side of a sheet Q22, and the image P25 is formed on a back side. Further, the image P26 is formed on a front side of the sheet Q23, and the image P27 is formed on a back side. As described above, if the breaking pattern is not printed, the page configuration of the copy is shifted as compared to the original page configuration. In particular, each page is shifted disadvantageously in a case where there are pages which form one picture on each two-page spread.

Figure 6:
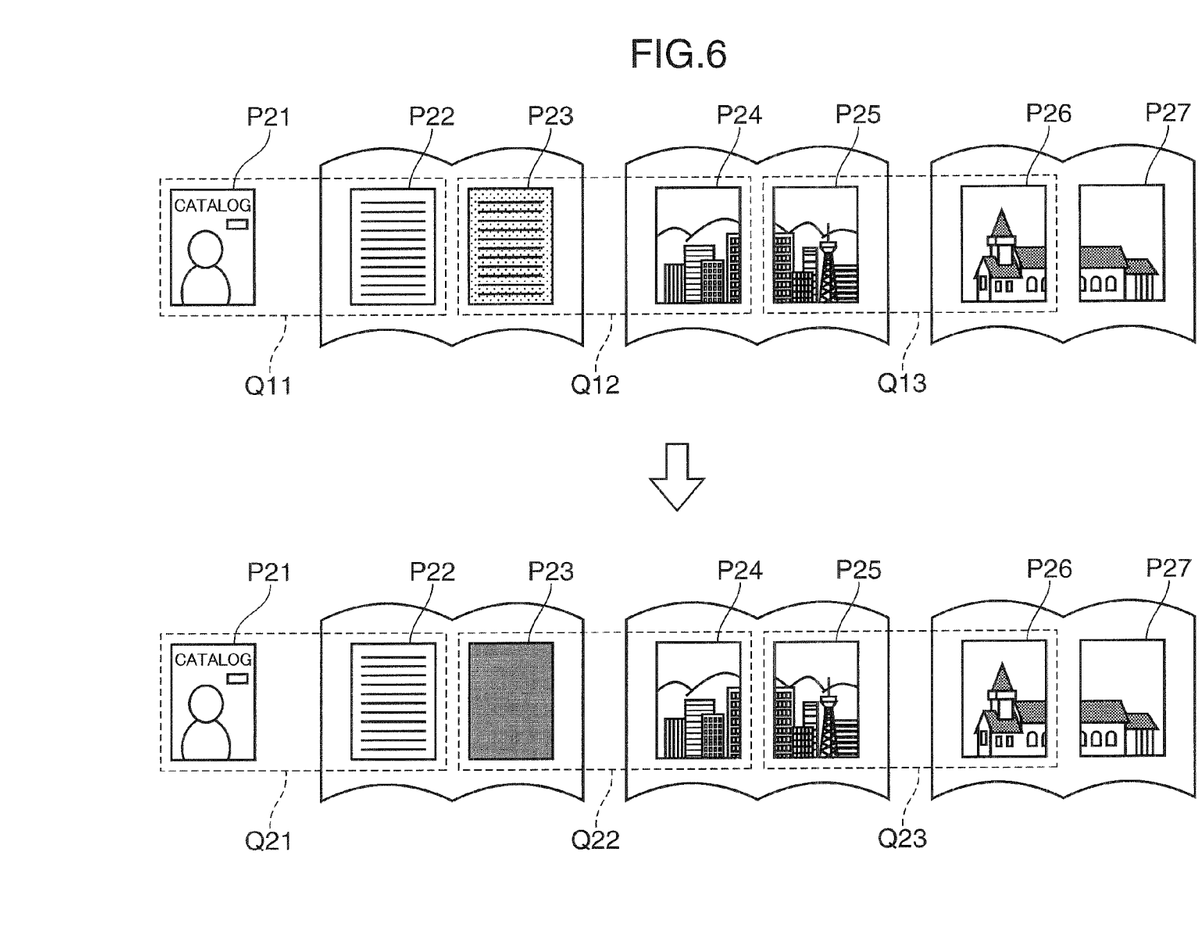
FIG. 6 shows copies which can be obtained when double-sided printed documents are copied.

Therefore, the copying machine 1 will be proposed which automatically switches the setting between the setting of printing the breaking pattern in the case of the double-sided copying, and the setting of not printing the breaking pattern in the case of the single-sided copying. Accordingly, as shown in FIG. 6, the breaking pattern is inserted into the image P23 and printed, so that the spread pages of the images P24-P27 do not shift, so that the copying can be performed in the same state as the configuration of original pages. On the other hand, not printing the breaking pattern in the case of the single-sided copying can prevent wasteful use of sheet and toner for image data of the document having the breaking pattern.

Figure 7:
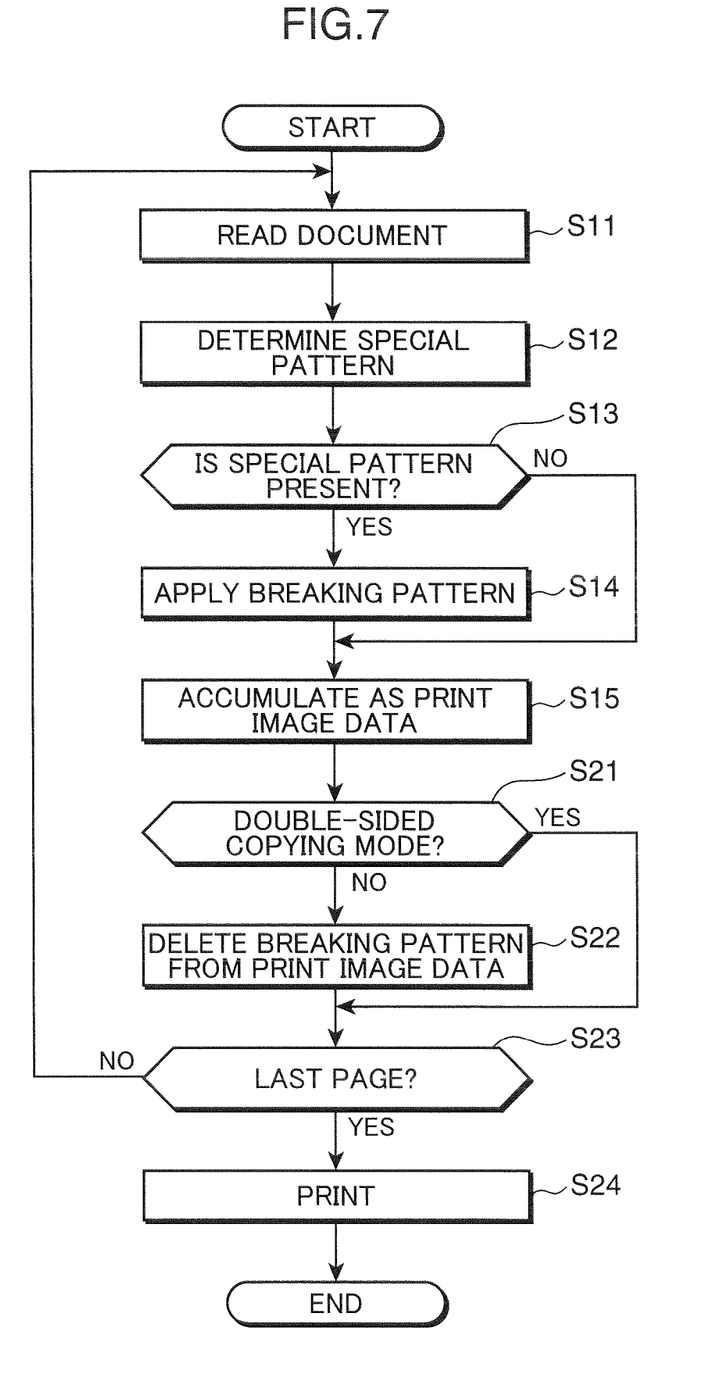
FIG. 7 is a flowchart showing a flow of a printing processing in accordance with a second embodiment.

FIG. 7 is a flowchart showing a flow of the processing which is executed by the controller 10 in accordance with the print program 112 according to the present embodiment. Here, the processing of steps S11-S15 in FIG. 7 is the same as the processing of the print program described with reference to FIG. 4 in the first embodiment, thus detailed description of those will be omitted.

After step S15, the controller 10 determines whether the setting of the print mode setting section 105 is in the double-sided copying mode (step S21). In the case where the double-sided copying mode is set (step S21; YES), the controller 10 allows the processing to proceed to step S23. On the other hand, if the single-sided copying mode (in the present embodiment and the following embodiment, copying operation other than the double-sided document reading and the double-sided printing will be referred to as "single-sided copying") is set (step S21; NO), the controller 10 deletes image data of the document image having the breaking pattern from the print image data stored in the memory 103a (step S22).

Then, if there is a page to be continuously read (step S23; NO), the controller 10 allows the processing to go back to step S11. If the document is the last page (step S23; YES), the controller 10 transfers the print data stored in the memory 103a to the image forming section 16, and the image forming section 16 forms an image based on the print image data onto the sheet (step S24). Or, after the image processing section 14 applies image processing such as image correction, enlargement/reduction, and the like to the print image data stored in the memory 103a, the image forming section 16 forms the image based on the image-processed print image data onto a sheet. Then, the controller 10 terminates the processing.

As described above, the controller 10 performs a control of deleting the document image (page) having the inserted breaking pattern from the memory 103a in the case of the single-sided copying, and performs a control of printing the document image (page) having the inserted breaking pattern in the case of the double-sided copying. Accordingly, in the case where a double-sided printed document is double-sided copied, the pages on which one picture is formed in two-page spread do not shift even if the document includes the special pattern is included. On the other hand, in the case of the single-sided copying, the controller 10 does not perform a control of printing the breaking pattern, wasteful use of sheet and toner can be prevented.

Third Embodiment

In the second embodiment, the copying machine is described which is so set that, the breaking pattern is not printed in the case of the single-sided copying, and the breaking pattern is printed in the case of the double-sided copying. In the third embodiment, a copying machine will be described which does not print the breaking pattern in the case where the breaking pattern is to be printed on front and back sides of a sheet in the case of the double-sided copying since the special pattern is embedded in both sides of the document. Since the configuration of the copying machine in the present embodiment is the same as the configuration of the copying machine 1 described in the first embodiment, description will be omitted.

Figure 8:
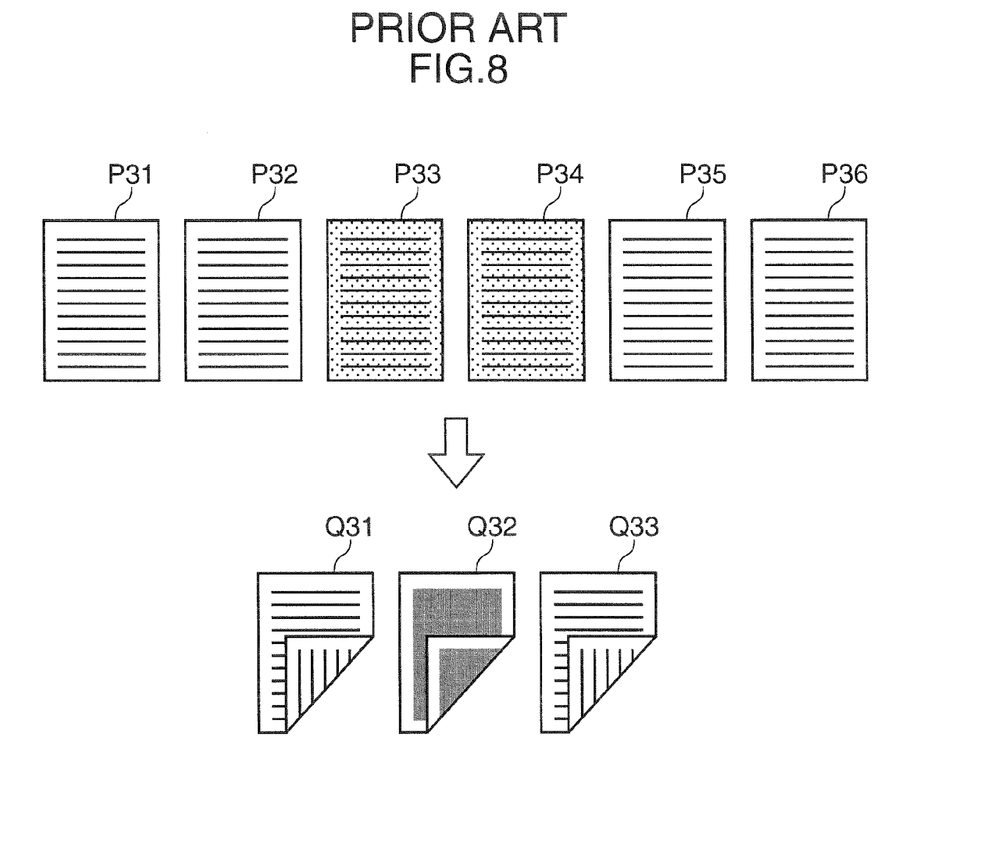
FIG. 8 shows copies which can be obtained when documents are double-sided copied.

FIG. 8 shows the case where images P31-P36 are double-sided copied with a conventional copying machine having the copy guard function. For example, in the case where the special pattern is embedded in the images P33 and P34, if the documents having the images P31-P36 respectively are double-sided copied, the breaking pattern is printed on both sides of a sheet Q32, as shown in the lower portion of FIG. 8. If the breaking pattern is printed on both sides of the sheet, the sheet is often discarded, thereby causing waste of sheet and toner.

Therefore, the copying machine 1 is proposed which performs a control of printing the breaking pattern in the case of the double-sided copying mode and in the case where a document image is to be printed on one side of a sheet and the breaking pattern is to be printed on the other side of the sheet, and performs a control of not printing the breaking pattern in the case where the breaking pattern is to be printed on both sides of the sheet.

Figure 9:
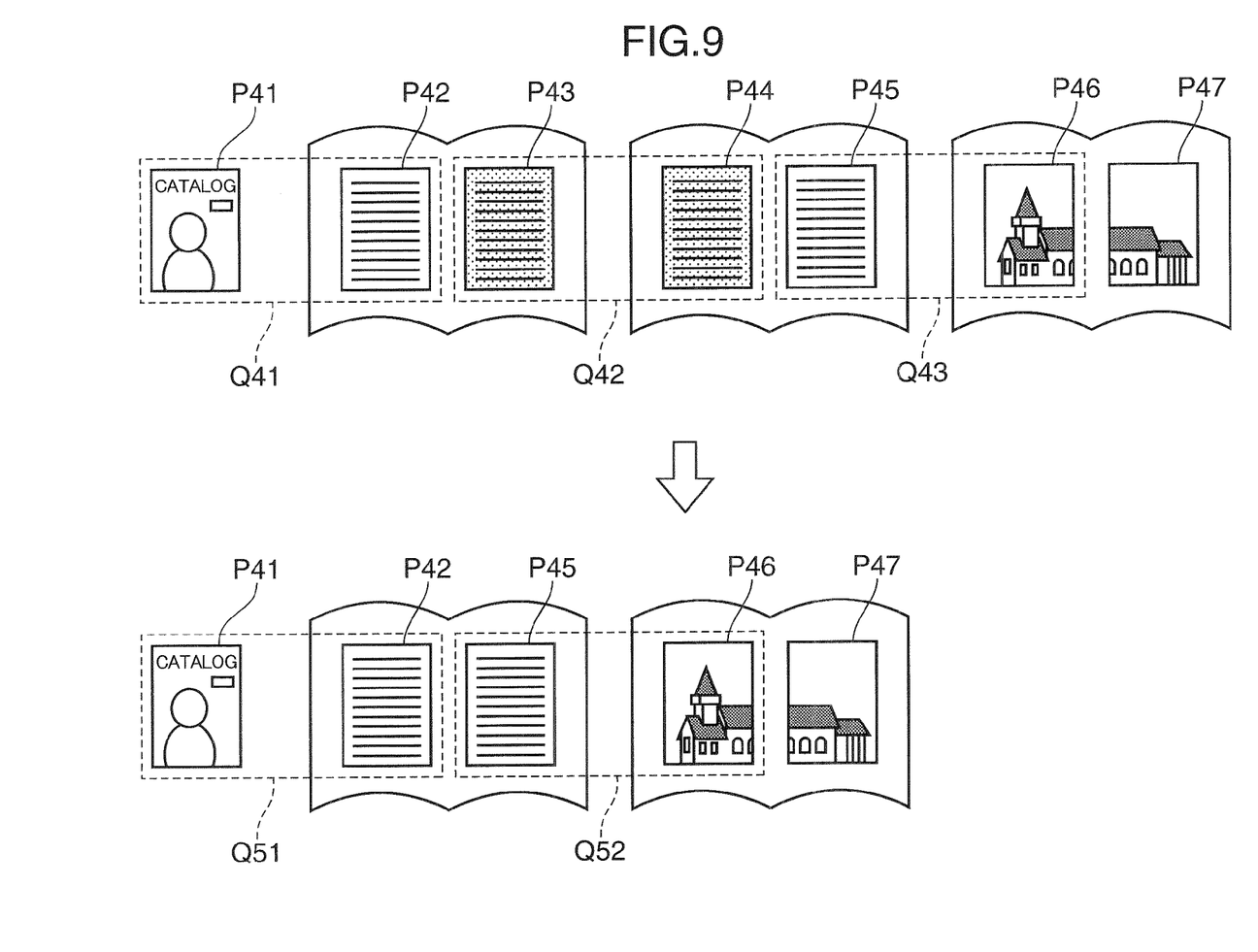
FIG. 9 shows copies which can be obtained when double-sided printed documents are copied.

In other words, as shown in FIG. 9, in the case where documents are provided on which images P41-P47 are double-sided printed, and the special pattern is embedded in the image P43 printed on a front side of a sheet Q42 and the image P44 printed on a back side of a sheet Q42, if the images are double-sided copied, a sheet is outputted on which the breaking pattern is formed on both sides.

Therefore, as described above, in the case where the double-sided copying is performed, and the breaking pattern is to be printed on both sides of a sheet, the breaking pattern is not printed, thereby the page onto which the breaking pattern corresponding to the images P43 and P44 can be taken off, as shown in the lower portion of FIG. 9. Accordingly, wasteful use of sheet and toner can be prevented. Further, since printing of breaking pattern is performed in such a manner that the breaking pattern is printed only on one side of the sheet, the page configuration does not shift even in the case where there are pages which form one picture in two-page spread.

Figure 10:
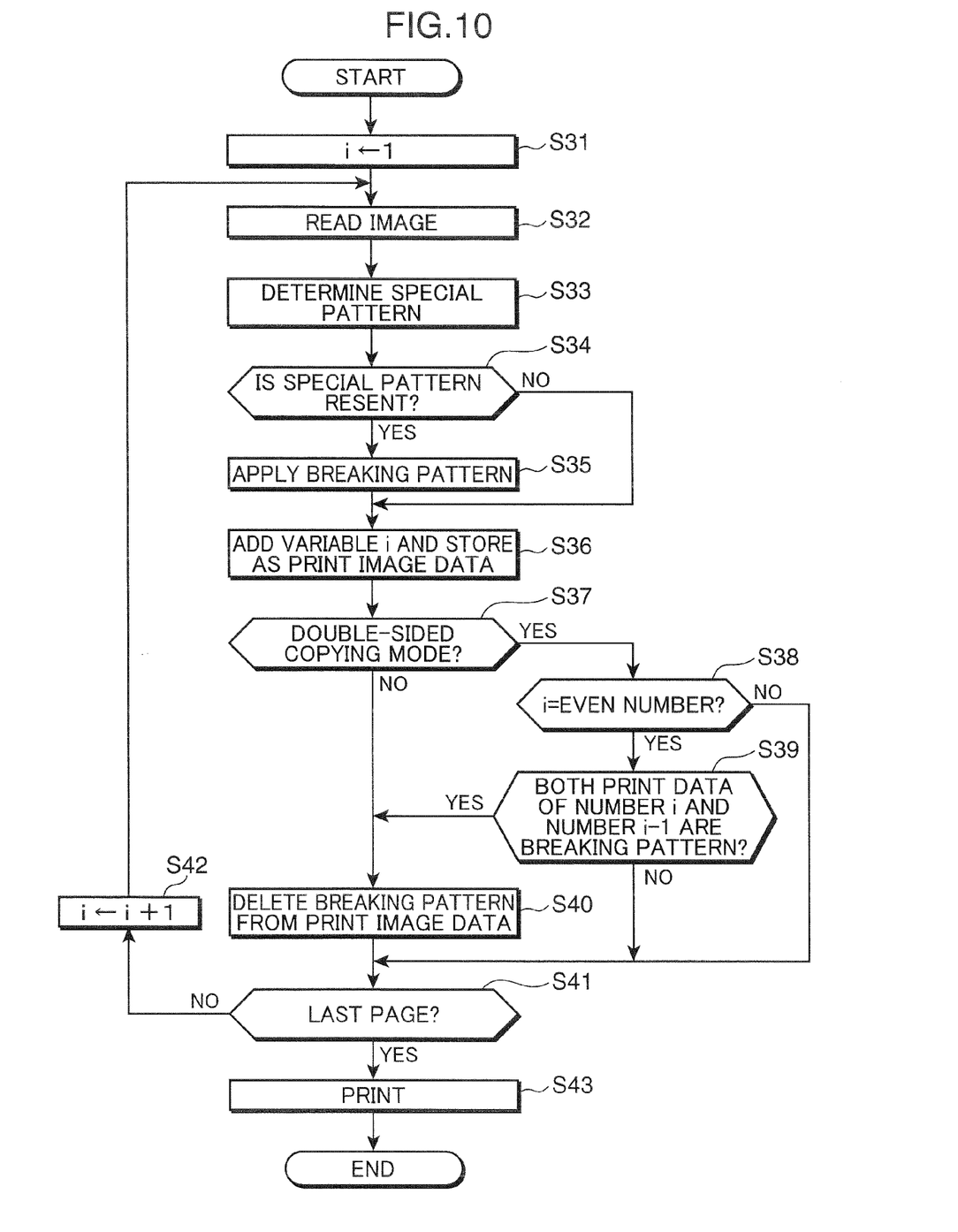
FIG. 10 is a flowchart showing a flow of a printing processing in accordance with a third embodiment.

FIG. 10 is a flowchart which shows a flow of processing executed by the controller 10 in accordance with the print program 112 according to the present embodiment. Firstly, the controller 10 substitutes 1 into variable "i" ("i" is an integer which is equal to or greater than 1) (step S31). Here, the variable "i" is a variable which is set in a working memory (not illustrated) provided in the controller 10.

Next, the controller 10 controls the document reading section 12 to read a document image (step S32). Then, the special pattern determination section 101 determines whether the special pattern is included in the document image (step S33). If it is determined that the document image includes the special pattern (step S34; YES), the breaking pattern applying section 102 applies the breaking pattern to the document image (step S35), and the print image generating section 103 accumulates and stores image data of the document having the breaking pattern as print image data into the memory 103a (step S36).

If it is determined that the document image does not include the special pattern (step S34; NO), the print image generating section 103 accumulates the image data of the document image obtained in step S32 as print image data into the memory 103a (step S36).

In step S36, the print image generating section 103 adds a value of the variable "i" to the print image data and stores the print image data into the memory 103a.

Next, the controller 10 determines whether the double-sided copying mode is set in the print mode setting section 105 (step S37). If the double-sided copying mode is set (step S37; YES), the controller 10 reads the variable "i" stored concomitantly with the print data from the memory 103a. If the variable "i" is an uneven number (step S38; NO), the controller 10 allows the processing to proceed to S41.

On the other hand, if the double-sided copying mode is set (step S37; YES), and the variable "i" is an even number (step S38; YES), the controller 10 determines whether, among print image data accumulated in the memory 103a, the breaking pattern is applied to both print image data having the variable number "i–1" and print data having the variable number "i" (step S39).

If the breaking pattern is applied in neither of the print image data, or the breaking pattern is applied only on either one of the print image data (step S39; NO), the controller 10 allows the processing to proceed to step S41.

On the other hand, if the breaking pattern is applied to both of the print image data (step S39; YES), the controller 10 deletes both the print image data having the variable number "i–1" and the print image data having the variable number "i" from the memory 103a (step S40).

Further, if the single-sided copying mode is set in the print mode setting section 105 (step S37; NO), the controller 10 deletes image data of the document having the breaking pattern from the print image data stored in the memory 103a (step S40).

Then, if there is a document to be read continuously (step S41; NO), the controller 10 adds 1 to the variable "i" which is to be set in the working memory (step S42), and then allows the processing to go back to step S32. If it is the last page (step S41; YES), the controller 10 transfers the print image data stored in the memory 103a to the image forming section 16, and the image forming section 16 forms images based on the print image data onto sheets (step S43). Or, after the image processing section 14 executes image processing such as image correction and enlargement/reduction, and the like to the print image data stored in the memory 103a, the image forming section 16 forms images based on the image-processed print image data. Then, the controller 10 terminates the processing.

As described above, according to the third embodiment, in the case where the double-sided copying is performed, and the breaking pattern is to be printed on both sides of a sheet, image data (pages) of the document image having the breaking pattern is not printed, thereby preventing wasteful use of sheet and toner. Further, according to the third embodiment, the breaking pattern is printed in the case where the breaking pattern is to be printed only on one side of the sheet, thus the page configuration is not shifted even in the case where there are pages which form one picture in two-page spread.

In the third embodiment, the case of performing the double-sided copying is described as an example. However, it may be so configured that, even in the case of performing the single-sided copying, if the double-sided printing is performed by the image forming operation, the printing is not performed if the breaking pattern is printed on both sides of a sheet, or the breaking pattern is printed if the breaking pattern is printed only on one side of the sheet. This control can be executed if, in the series of processing shown in FIG. 10, the controller 10 determines in step S37 whether the double-sided printing is performed regardless of that the document reading is the double-sided reading or the single-sided reading.

The present invention is not limited to the configurations of the aforementioned embodiments, and it can be modified in various ways. For example, if it is so set that the breaking pattern is not to be printed or outputted in the case where the page number is printed on the document, a printed object or output data which can be obtained by the printing or output lacks a page corresponding to the document including special pattern, thus the page numbers of the printed object do not become successive. In other words, the printed object or the output data lacks the page number of the document including the special pattern. Therefore, it may be so configured as to print or output the breaking pattern in the case where the page number is printed on the document.

Figure 11:
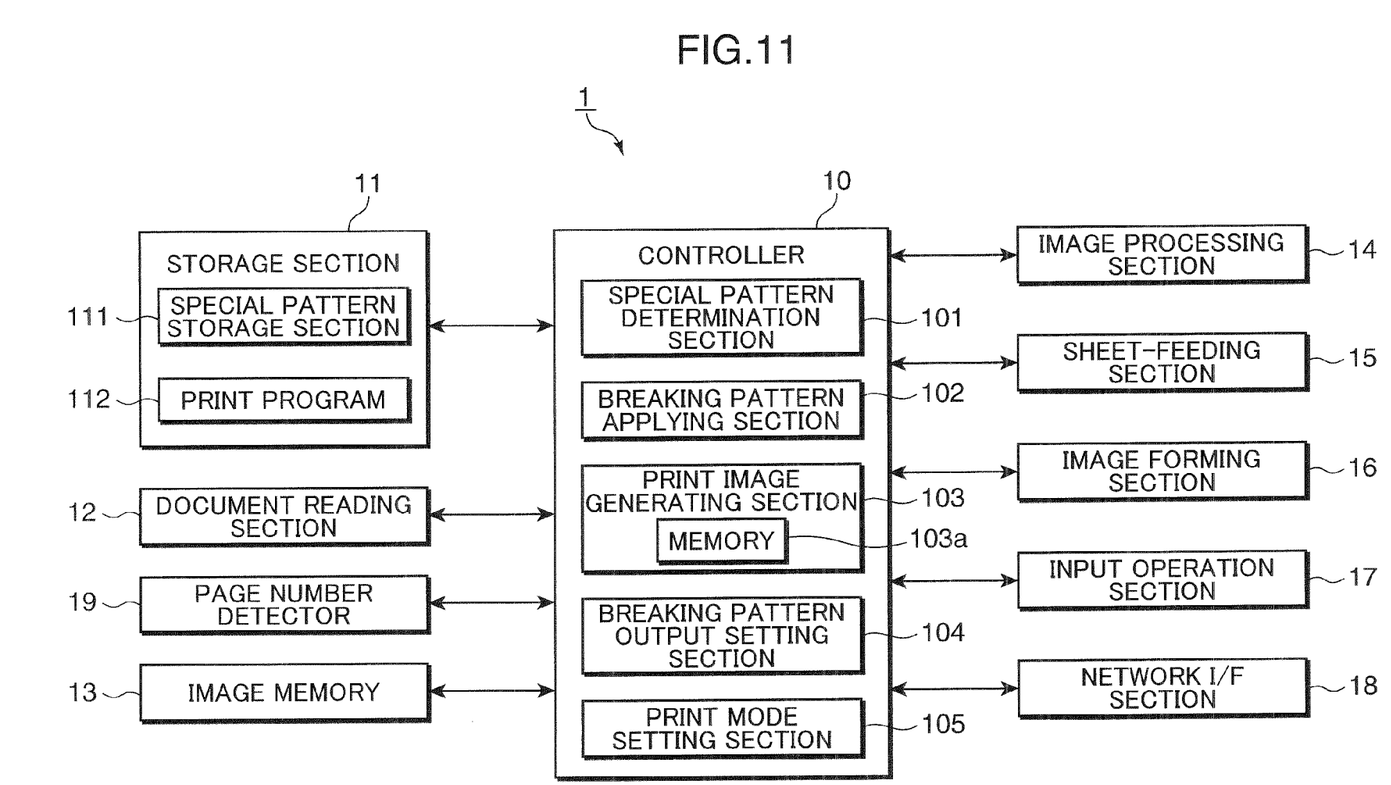
FIG. 11 is a block diagram showing an electric configuration of the copying machine in accordance with another embodiment.

In particular, as shown in FIG. 11, a page number detector 19 may be provided for detecting whether a number indicating the page number is present in an area corresponding to a margin portion of a document image read by the document reading section 12. In the case where the number indicating the page number is detected by the page number detector 19, the controller 10 controls the image forming section 16 to print the document image having the breaking pattern. In the case where the number indicating the page number is not detected by the page number detector 19, the controller 10 controls the image forming section 16 not to print the document image having the breaking pattern. Or, in the case where the number indicating the page number is detected by the page number detector 19, the controller 10 may control the network I/F section 18 or the like to output a document image having the breaking pattern to an external device (personal computer, facsimile machine, or the like) connected to a network connect. In the case where the number indicating the page number is not detected by the page number detector 19, the controller may control the network I/F section 18 or the like not to output the document image having the breaking pattern to an external device connected to a network.

In summary, an image processing apparatus in accordance with an aspect of the present invention includes: a reading section which reads a document image from a document; a storage section which stores a predetermined special pattern; a determination section which determines whether the special pattern is included in the document image read by the reading section; a breaking section which breaks the document image by applying a breaking pattern to the document image when the determination section determines that the special pattern is included in the document image; an output section which outputs the document image; and a controller which decides whether to control the output section to output the document image having the breaking pattern in accordance with a predetermined setting, and controls output of the document image by the output section in accordance with the decision.

Further, according to another aspect of the present invention, a computer-readable recording medium storing an image processing program allows a computer to serve as: a storage section which stores a predetermined special pattern; a determination section which determines whether the special pattern is included in a document image; a breaking section which breaks the document image by applying a breaking pattern to the document image when the determination section determines that the special pattern is included in the document image; an output section which outputs the document image; a controller which decides whether to control the output section to output the document image having the breaking pattern in accordance with a predetermined setting, and controls output of the document image by the output section in accordance with the decision.

According to the aspects of the invention, whether to output a document image applied with a breaking pattern can be switched in accordance with a predetermined setting. Therefore, the controller controls the output section not to output the breaking pattern in accordance with the setting. Accordingly, the data amount of image data outputted from the output section can be reduced by the amount of image data of document image applied with the breaking pattern, so that, for example, data transfer time for transferring image data to an external device can be shortened.

For example, according to the conventional technology, a special pattern is detected from a document image, and copying is prohibited, and the breaking pattern is printed and outputted to a sheet, a user obtains a needless sheet. In such case, the sheet is likely to be discarded, and sheet and toners becomes a waste. However, according to the present invention, such waste can be eliminated.

Further, according to the conventional technology, in the case where a document image is transmitted to an external facsimile machine by using a facsimile function, a page corresponding to a document having an special pattern is applied with the breaking pattern and transmitted, thus wasteful data is transmitted to a facsimile machine on a destination side, thereby causing a wasteful printing. According to the present invention, such wasteful printing can be eliminated.

Further, according to the conventional technology, in the case where a document image is transferred to a personal computer or the like through a network, a personal computer on a receiver side is required to receive data having a wastefully large size if a document image applied with the breaking pattern is included. However, according to the present invention, necessity of receiving such data having a wastefully large size can be eliminated.

Further, according to an aspect of the present invention, there is further provided a reception section which receives an instruction on whether the document image having the breaking pattern is to be outputted. When the reception section receives an instruction of not to output the document image with the breaking pattern, the controller controls the output section not to output the document image having the breaking pattern.

According to the aspect of the invention, a user can selectively set whether to output the breaking pattern. Therefore, if the user sets the breaking pattern not to be printed, the data amount of image data outputted from the output section can be reduced by the amount of image data of document image applied with the breaking pattern, so that data transfer time for transferring image data to an external device can be shortened.

Further, according to an aspect of the present invention, there is further provided: a page number detector which detects whether a number indicating a page number is present in an area corresponding to a margin of the document image. If the page number detector detects the number indicating the page number, the controller controls the output section to output the document image having the breaking pattern, and if the page number detector does not detect the number indicating the page number, the controller controls the output section not to output the document image having the breaking pattern.

According to this aspect of the invention, if the page number is printed on a document, the breaking pattern is outputted. Accordingly, a document image corresponding to a document including a special pattern is necessarily outputted, so that the page numbers applied to images constituting the printed object or output data become successive.

Further, according to another aspect of the present invention, an image forming apparatus includes: the image processing apparatus according to the present invention. The output section outputs the document image by printing the document image onto a recording medium, and the controller decides whether to control the output section to output by printing the document image having the breaking pattern in accordance with the predetermined setting, and controls printing of the document image by the output section in accordance with the decision.

According to the aspect of the invention, whether to print the breaking pattern can be decided in accordance with a predetermined setting or setting by a user. Since a recording medium on which the breaking pattern is printed becomes a meaningless printed object having no information and is often discarded. However, according to the present invention, the breaking pattern is not printed in accordance with a predetermined condition or user's setting, so that wasteful use of recording medium and toner can be prevented.

Further, according to an image forming apparatus in accordance with an aspect of the present invention, when a printing mode of printing performed by the output section is set to be a single-sided printing mode, the controller controls the output section not to print the document image having the breaking pattern.

According to the invention, the breaking pattern is not printed in the single-sided printing mode, thus wasteful use of recording medium and toner can be prevented.

Further, according to an image forming apparatus in accordance with an aspect of the present invention, when a printing mode of printing performed by the output section is set to be a double-sided printing mode, and the breaking pattern is applied only on either one of document images to be printed on both sides of the recording medium, the controller controls the output section to print the document image having the breaking pattern.

According to this aspect of the invention, printing of the breaking pattern is executed in the case where the printing of the breaking pattern is performed only on one side in the double-sided printing mode. Therefore, even in the case where one picture is printed in two-page spread, the configuration of the spread pages does not shift.

Further, according to an image forming apparatus in accordance with an aspect of the present invention, when a printing mode of printing performed by the output section is set to be a double-sided printing mode, and the breaking pattern is applied to each of document images to be printed on both sides of the recording medium, the controller controls the output section not to print the document image having the breaking pattern.

According to this aspect of the invention, in the case where the breaking pattern is to be printed on both sides in the double-sided printing mode, printing of the breaking pattern is not performed. Therefore, wasteful use of recording medium and toner can be prevented.

Further, according to an aspect of the present invention, an image forming apparatus further includes: a page number detector which detects whether a number indicating a page number is present in an area corresponding to a margin of the document image. If the page number detector detects the number indicating the page number, the controller controls the output section to output the document image having the breaking pattern, and if the page number detector does not detect the number indicating the page number, the controller controls the output section not to output the document image having the breaking pattern.

According to this aspect of the invention, if the page number is printed on a document, the breaking pattern is outputted. Accordingly, a document image corresponding to a document including a special pattern is necessarily outputted, so that the page numbers applied to images constituting the printed object or output data become successive.

This application is based on Japanese Patent application serial No. 2008-116692 filed in Japan Patent Office on Apr. 28, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image processing apparatus, comprising: a reading section which reads a document image from a document; a storage section which stores a predetermined special pattern;
    a determination section which determines whether the special pattern is included in the document image read by the reading section;
    a breaking section which breaks the document image by applying a breaking pattern to the document image when the determination section determines that the special pattern is included in the document image;
    an output section which outputs the document image, a controller which decides whether to control the output section to output the document image having the breaking pattern in accordance with a predetermined setting, and controls output of the document image by the output section in accordance with the decision; and
    a page number detector that is detects whether a number indicating a page number is present in an area corresponding to a margin of the document image,
    wherein if the page number detector detects the number indicating the page number, the controller controls the output section to output the document image having the breaking pattern,
    and if the page number detector does not detect the number indicating the page number, the controller controls the output section not to output the document image having the breaking pattern.

2. The image processing apparatus according to claim 1 further comprising:
    a reception section which receives an instruction on whether the document image having the breaking pattern is to be outputted, wherein when the reception section receives an instruction of not to output the document image with the breaking pattern, the controller controls the output section not to output the document image having the breaking pattern.

3. An image forming apparatus comprising: an image processing apparatus that includes:
    a reading section that reads a document image from a document; a storage section that stores a predetermined special pattern; a determination section that determines whether the special pattern is included in the document image read by the reading section;
    a breaking section that breaks the document image by applying a breaking pattern to the document image when the determination section determines that the special pattern is included in the document image;
an output section that outputs the document image by printing the document image onto a recording medium,
    a controller that decides whether to control the output section to print and output the document image having the breaking pattern in accordance with the predetermined setting, and controls printing of the document image by the output section in accordance with the decision; and the image forming apparatus further comprises:
    a page number detector that detects whether a number indicating a page number is present in an area corresponding to a margin of the document image, wherein
if the page number detects the number indicating the page number, the controller controls the output section to output the document image having the breaking pattern, and if the page number detector does not detect the number indicating the page number, the controller controls the output section not to output the document image having the breaking pattern.

4. The image forming apparatus according to claim 3, wherein when a printing mode of printing performed by the output section is set to be a single-sided printing mode, the controller controls the output section not to print the document image having the breaking pattern.

5. A image forming apparatus comprising:
a reading section that reads a document image from a document; a storage section that stores a predetermined special pattern;
a determination section that determines whether the special pattern is included in the document image read by the reading section;
a breaking section that breaks the document image by applying a breaking pattern to the document image when the determination section determines that the special pattern is included in the document image;
an output section that outputs the document image by printing the document image onto a recording medium;
a controller that decides whether to control the output section to print and output the document image having the breaking pattern in accordance with the predetermined setting, and controls printing of the document image by the output section in accordance with the decision; and
wherein, the controller: determines, when a printing mode of printing performed by the output section is set to be a double-sided printing mode,
whether the breaking pattern is applied only on either one of document images to be printed on both sides of the recording medium or the breaking pattern is applied to each of the document images to be printed on both sides of the recording medium;
controls the output section to print the document image having the breaking pattern when it is determined that the breaking pattern is applied only on either one of the document images to be printed on both sides of the recording medium;
and controls the output section not to print the document image having the breaking pattern when it is determined that the breaking pattern is applied to each of document images to be printed on both sides of the recording medium.

6. A non-transitory computer recording medium storing an image processing program which allows a computer to serve as:
a storage section which stores a predetermined special pattern;
a determination section which determines whether the special pattern is included in a document image;
a breaking section which breaks the document image by applying a breaking pattern to the document image when the determination section determines that
the special pattern is included in the document image;
an output section which outputs the document image; a controller which decides whether to control the output section to output the document image having the breaking pattern in accordance with a predetermined setting, and controls output of the document image by the output section in accordance with the decision; and
a page number detector that detects whether a number indicating a page number is present in an area corresponding to a margin of the document image, wherein if the page number detector detects the number indicating the page number, the controller controls the output section to output the document image having the breaking pattern, and if the page number detector does not detect the number indicating the pare number, the controller controls the output section not to output the document image having the breaking pattern.

* * * * *